A. W. EPRIGHT.
BEAM SCALE.
APPLICATION FILED JULY 14, 1916.
1,262,028.
Patented Apr. 9, 1918.
2 SHEETS—SHEET 1.
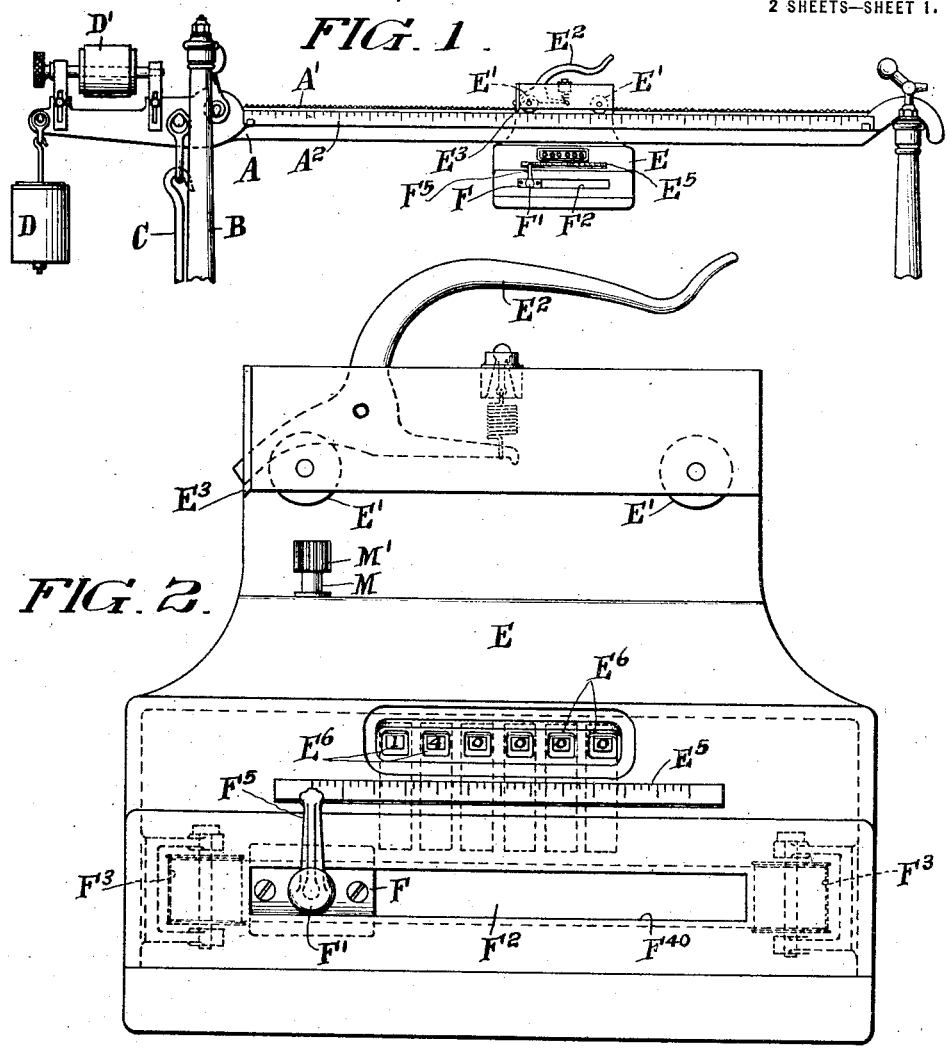
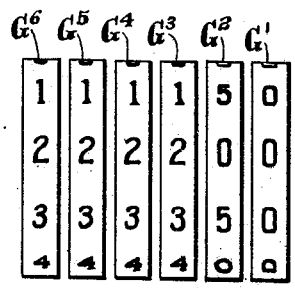

A. W. EPRIGHT.
BEAM SCALE.
APPLICATION FILED JULY 14, 1916.
1,262,028.
Patented Apr. 9, 1918.
2 SHEETS—SHEET 2.
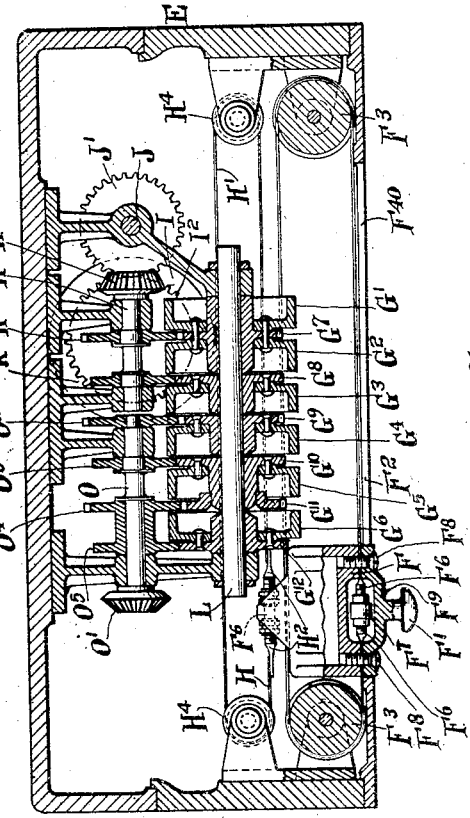
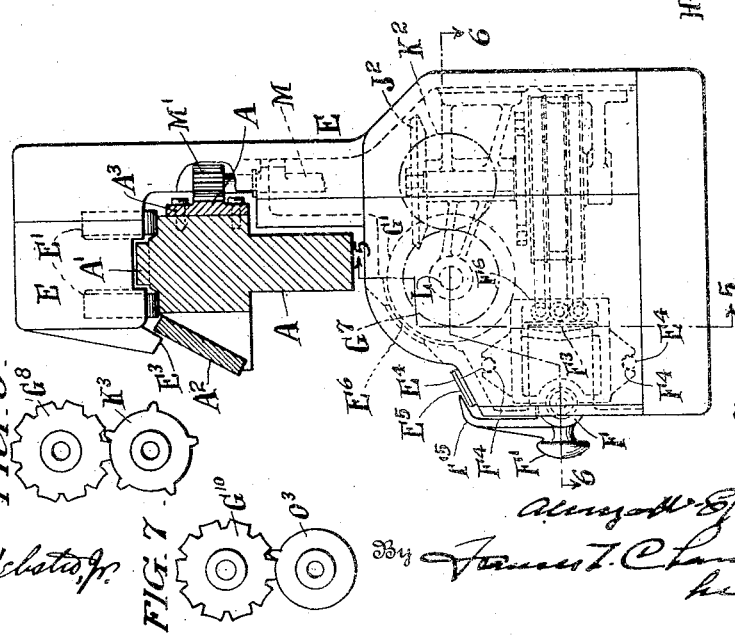
Witness
Daniel Webster, Jr.
Inventor
Alonzo W. Epright
By
his Attorney

UNITED STATES PATENT OFFICE.

ALONZO W. EPRIGHT, OF ALTOONA, PENNSYLVANIA.

BEAM-SCALE.

1,262,028.  Specification of Letters Patent.  Patented Apr. 9, 1918.

Application filed July 14, 1916. Serial No. 109,246.

*To all whom it may concern:*

Be it known that I, ALONZO W. EPRIGHT, a citizen of the United States of America, and resident of Altoona, in the county of Blair and State of Pennsylvania, have invented a certain new and useful Improvement in Beam-Scales, of which the following is a true and exact description, reference being had to the accompanying drawings, which form a part thereof.

My present invention relates to beam scales of the type in which a main poise mounted on and shiftable along the scale beam is provided with an auxiliary poise adjustably mounted on the main poise and employed to measure weight subdivisions finer than those readily weighed by the bodily adjustment of the main poise. This type of beam scale is commonly employed for instance, in weighing railway cars, and in a modern track scale of this type provisions are commonly made for adjusting the main poise along the beam by increments which are fixed by the spacing of the notches in the scale beam and correspond to weight variations of 1000 pounds each, while the auxiliary poise is adapted to be adjusted by increments corresponding to weight differences of fifty pounds each.

In the ordinary use of such a railway track scale, the main poise is first adjusted to the position nearer the zero point of the two adjacent positions at opposite sides of the position which the main poise would have to occupy to exactly balance the weight of the car being weighed, and the auxiliary poise is then shifted to complete the approximate balance of the scale. The position of the auxiliary poise then indicates the fraction of a thousand pounds by which the actual weight of the car exceeds the weight, in even thousands of pounds, indicated by the setting of the main poise. The operation of weighing thus involves a setting of the main poise to a position in which the load is nearly but not quite balanced, and the further setting of the auxiliary poise into a still closer and final approximation of balance, and the reading of the weight. The reading of the weight involves an observation of the position of the main poise on the scale beam, and determination of the position of the auxiliary poise on the main poise. The two readings and their correlation in the mind of the operator, obviously takes more time than would be required if the weight were determined by a single observation, and involve an increased possibility of error.

The object of my present invention is to provide simple and effective means for indicating the weight jointly measured by the setting of the main and auxiliary poises in such a manner that the numerical value of this weight is so displayed that it can be easily and accurately read at a single glance. In the preferred mode of carrying out my invention I mount on the main poise a register comprising a plurality of dial wheels or analogous numeral exhibitors which coöperate to display the numerical value of the weight balanced by the scale beam in any setting of the two poises. The register comprises actuating means whereby the dial wheels, or the like numeral exhibitors of the register bearing the higher orders of numerals, as the thousands, ten thousands and hundred thousands, are automatically adjusted by the relative movement of the main poise and the scale beam, and whereby the numeral exhibitors bearing the lower orders of numerals, as for example, the units, tens and hundreds, are automatically actuated by the relative movements of the main and auxiliary poises. The practical importance of my improvement when used in connection with ordinary railway track scales will be understood from the fact that in the ordinary operation of weighing a train of cars in motion, not more than four or five seconds is permitted the weigh master in which to adjust the poises to balance the weight of a car, and to read and record the weight indication jointly indicated by the positions of the poises.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of my invention.

Of the drawings:

Figure 1 is an elevation of a portion of a beam weighing scale;

Fig. 2 is an elevation, on a larger scale than Fig. 1, of the main poise shown in Fig. 1;

Fig. 3 is an elevation of the weight register wheels employed;

Fig. 4 is an end elevation of the poise shown in Fig. 2;

Fig. 5 is a sectional elevation taken on the broken line 5—5 of Fig. 4;

Fig. 6 is a sectional plan taken on the line 6—6 of Fig. 4.

Fig. 7 is an elevation of a coöperating pair of gears employed in the weight register; and Fig. 8 is a similar view of another pair of gears employed in the weight register.

In the drawings, A represents the beam of a platform scale of the type employed in weighing railway cars, the beam A being fulcrumed on the beam supporting post B. C represents the connection between the beam A and the load balanced thereby. D and D' represent the usual weights by which the scale as a whole is balanced, and E represents the main poise mounted on and adjustable along the scale beam A. As shown, the poise E comprises a body provided with anti-frictional rolls E' running on the upper edge of the beam A and provided with a positioning detent $E^2$ for entering the notches A' provided in the upper edge of the scale beam. In ordinary railway track scales these notches are separated from one another by distances corresponding to weight differences of a thousand pounds, and the index $E^3$ carried by the poise E may thus coöperate with the graduated scale $A^2$ provided on the beam A to indicate the approximate weight of the load in thousands of pounds. In so far as the mechanism illustrated has now been specifically described it embodies nothing now novel with me.

As shown, the poise E is chambered to provide a channel receiving the auxiliary poise F which is formed at its upper and lower edges with grooves $F^4$ receiving ribs or guideways $E^4$ carried by the poise E. The poise F has adjustably secured to it the ends of a steel tape or like band $F^2$ which runs over pulleys $F^3$ journaled in the main poise E. The band $F^2$ terminates in threaded end portions $F^6$ connected by a turnbuckle $F^7$ located in a chamber formed between the body of the poise F and the removable front $F^9$ which is secured to the body of the poise F by screws $F^8$ and serves to clamp the ends of the band $F^2$ to the poise, the latter being formed with elongated slots to receive the screws $F^8$. The band $F^2$ serves to obviate the possibility of the auxiliary poise canting in, and jamming between the guide ribs $E^4$, and it also serves to close in a practically dust proof manner, the slot $E^{40}$ formed in the front side of the poise E to permit the passage of the handle F' by which the auxiliary poise F is adjusted. The handle F' is provided with an index projection $F^5$ which coöperates with the graduated scale $E^5$ to show the weight variations measured by the adjustment of the auxiliary poise F with respect to the main poise E. In a railway track scale the scale $E^5$ is commonly graduated in increments of fifty pounds.

The poise E is chambered, in the construction shown, to receive a weight register consisting of dial or number exhibitor wheels G', $G^2$, $G^3$, $G^4$, $G^5$ and $G^6$, and their operating means. Each of the dial wheels bears numerals on its periphery which are visible, one at a time, through the openings $E^6$ formed in the front wall of the main poise. Associated with the number exhibiting wheels of the weight register are means for automatically adjusting these wheels, as the main and auxiliary poises are adjusted, so that the member formed by the numerals of the different wheels G', $G^2$, $G^3$, $G^4$, $G^5$ and $G^6$ visible through the openings $E^6$ at any instant will be the number of pounds balanced by the scale beam, with the corresponding setting of the main and auxiliary poises. The operating connections for the number wheels of the register comprise means actuated by the relative movements of the auxiliary and main poises for adjusting the number wheels corresponding to the lower orders of numerals of the number shown by the register, and means actuated by the relative movement of the main poise and beam for adjusting the number wheels bearing the high order of numerals. Thus in the apparatus shown, the wheels $G^4$, $G^5$ and $G^6$ may be, and are intended to be, the thousand pound, ten thousand pound and hundred thousand pound wheels of the register, and are automatically actuated by the relative movement of the main poise and beam, while the wheels G', $G^2$ and $G^3$ are intended to serve as the unit, ten and hundred pound wheels of the register and are automatically adjusted by the movement of the auxiliary poise relative to the main poise.

The means provided for adjusting the wheels G', $G^2$ and $G^3$ comprise steel tapes H and H' each connected at one end to the poise F and at the other end to the periphery of the drum I journaled on a vertical shaft I'. As shown, the flexible elements H and H' are each provided with a threaded end $H^2$ by which the band may be adjustably connected to the web $F^6$ of the poise F. The bands H, of which there are two, are shown, run around a pulley or idler roll $H^3$ at one end of the path of travel of the poise F and the flexible elements H' run around an idler roll $H^4$ at the other end of the path of movement of the poise F. With this arrangement the drum I will be retated in exact proportion to the linear motion of the poise F along the guides $E^4$.

Secured to the drum I and coaxial therewith is a spur gear $I^2$ which meshes with a spur gear $J'$ secured on a vertical shaft J journaled in the poise E and carrying at its upper end a bevel gear $J^2$ which meshes with a bevel gear $K'$ secured on a shaft K. The shaft K has secured to it a spur gear $K^2$ and an intermittent gear $K^3$. The gear $K^2$ meshes with a spur gear $G^7$ journaled on the stationary shaft L and forming the hub, so to speak, of the number wheels $G'$ and $G^2$ which are rigidly secured to the gear $G^7$. The gear $K^3$ meshes with an intermittent spur gear $G^8$ journaled on the shaft L and forming the hub of the number wheel $G^3$. The ratio of the intermittent gears $K^3$ and $G^8$ is 2 to 1, and, as shown in Fig. 8, these gears are of a type commonly employed in registers. The ratio of the gears $K^2$ and $G^7$ is 1 to 1. Since the mechanism shown is not intended to show weight variations of less than fifty pounds, the wheel $G'$ carries a circular series of ten zeros, while the wheel $G^2$ bears a peripheral series of zero marks with numerals 5 alternating therewith. The symbols on the periphery of the wheel $G^3$, like those on the wheels $G^4$, $G^5$ and $G^6$, include a zero mark and the nine digits arranged in regular order.

It will be apparent that as the poise F is moved away from the zero position in which the wheels $G'$, $G^2$ and $G^3$ each exhibits a zero mark, the corresponding rotation of the shaft K will cause these wheels to successively register 50, 100, 150, and so on up to the final position in which each of these wheels again exhibit a zero mark.

The movement of the poise E along the scale beam A actuates the register wheels $G^4$, $G^5$ and $G^6$ through gearing comprising a rack bar $A^3$ secured to the rear side of the scale beam, and a spur gear $M'$ carried at the upper end of a vertical shaft M journaled in the poise E. At its lower end the shaft M carries a spur gear $M^2$ which meshes with and drives a bevel gear $O'$ secured to a shaft O which is in axial alinement with the shaft K. The shaft O has secured to it a spur gear $O^2$ meshing with a spur gear $G^9$ journaled on the stationary shaft L and forming the hub of the register wheel $G^4$. The ratio of the gears $O^2$ and $G^9$ is 1 to 1. An intermittent gear $O^3$ having a single driving tooth is secured to the shaft O and once for each revolution of the latter engages and advances through a tenth of a turn, a gear wheel $G^{10}$ journaled on the shaft L and forming the hub of the number wheel $G^4$. The gears $O^3$ and $G^{10}$ are shown in Fig. 7 as of a type in common use in registers having number wheels moving in a ten to 1 ratio. The gear $G^{10}$ also has secured to it a spur gear $G^{11}$ which meshes with a spur gear $O^4$ loosely journaled on the shaft O. The gear $O^4$ is shown as formed integral with a gear $O^5$ which is a one-tooth gear intermittently driving at a 1 to 10 ratio a gear wheel $G^{12}$ journaled on the shaft L. The gears $O^5$ and $G^{12}$ are similar respectively to the gears $O^3$ and $G^{10}$ shown in Fig. 7.

It will be apparent without detailed explanation that as the poise E is adjusted along the beam, the wheels $G^4$, $G^5$ and $G^6$ are adjusted as required so that in any setting of the poise E the thousand, ten thousand and hundred thousand numerals of the number which is the numerical value of the weight which the poise E balances in that position, is shown through the openings $E^6$ by the number wheels $G^4$, $G^5$ and $G^6$.

In the use of the scale mechanism illustrated, each weighing operation involves nothing but the adjustment of the main poise and the auxiliary poise, and the reading of the numerical value of the weight which is collectively exhibited by the wheels $G'$, $G^2$, $G^3$, $G^4$, $G^5$ and $G^6$ through the openings $E^6$. In the practical use of a railway track scale by a skilled weigh master, the weigh master is guided in adjusting the poises, entirely or practically so, by the sense of touch, and a single glance at the number formed by the numerals exhibited through the openings $E^6$ constitutes the entire visual inspection of the scale beam and parts carried by it required for a single weighing operation. The weight is indicated, moreover, in a manner which reduces the possibility of an error in reading the same, practically to a minimum.

The particular form of apparatus disclosed possesses a number of important practical advantages. For one thing the angular velocity of none of the number wheels need be undesirably high. For another thing, frictional resistance to movement of the auxiliary poise due to its tilting or jamming in the guideway of the main poise is practically eliminated by the use of the band $F^2$. This is of particular importance, of course because of the additional resistance to the movement of the auxiliary poise relative to the main poise due to the gearing connecting the auxiliary poise with the number wheels of the register. The means provided for connecting the ends of the tape or band $F^2$ to each other and to the poise F permit of an easy and accurate adjustment in the tension of the band $F^2$ to take up slack, or to avoid unnecessary tension, and without disturbing the relation of the center of gravity of the turnbuckle $F^7$ to the center of gravity of the remaining portions of the auxiliary poise. The practical importance of this will be obvious to those skilled in the art. The means provided for converting the reciprocating movement of the poise F into rotary movement of the shaft I' at right angles thereto is very effective because of the avoidance of sliding friction in the power transmitting connections between the poise F and the drum I, and because of the ease with which slack in the flexible connections H and H' may be taken up, and the ease with which the drum I may be set with respect to the poise F to make the zero position of the wheels $G'$, $G^2$ and $G^3$ correspond to the zero position of the pointer $F^5$ of the scale $E^5$.

While in accordance with the provisions of the statutes I have illustrated and described the best form of apparatus embodying my invention now known to me, it will be apparent to those skilled in the art that the invention in its broader aspects is not restricted to use with the particular form of apparatus disclosed and that changes therein may be made without departing from the spirit of my invention as set forth in the attached claims. It will also be apparent to those skilled in the art that certain features of the invention may sometimes be used to advantage without a corresponding use of other features.

Having now described my invention, what I claim as new and desire to secure by Letters Patent, is:

1. The combination with a scale beam of a main poise adjustably mounted on said beam and formed with a guideway, an auxiliary poise mounted in said guideway and provided with a handle portion by which said auxiliary poise may be adjusted, registering wheels mounted on said main poise, pulleys journaled on said main poise, and a flexible element running over said pulleys and connecting said auxiliary poise to said wheels.

2. The combination with a scale beam and the main poise adjustably mounted on said beam and an auxiliary poise adjustably mounted on the main poise, of a weight register mounted on said main poise and comprising a number of wheels, means for rotating some of said wheels in proportion to the relative movement of the main poise and beam, and means for rotating others of said wheels in proportion to the relative movement of said poises, said last mentioned means including a rotating drum journaled in said main poise and flexible elements connected to and extending in opposite directions away from said auxiliary poise and connected to and extending in opposite directions about the periphery of the drum whereby said drum is rotated in one direction or the other accordingly as said auxiliary poise is moved in one direction or the other.

3. The combination with a scale beam of a chambered main poise adjustably mounted on said beam and provided with a guide way for an auxiliary poise and with a slot in its wall adjacent said guide way, an auxiliary poise mounted in said guide way and comprising an operating portion projecting through said slot, pulleys at the opposite ends of said slot and a flexible element looped about said pulleys and connected to said auxiliary poise and coöperating with said auxiliary poise to close said slot.

4. The combination with a scale beam of a chambered main poise adjustably mounted on said beam and provided with a guide way for an auxiliary poise and with a slot in its wall adjacent said guide way, an auxiliary poise mounted in said guide way and comprising an operating portion projecting through said slot, pulleys at the opposite ends of said slot and a flexible element looped about said pulleys and adjustably connected at its ends to said auxiliary poise, and coöperating with said auxiliary poise to close said slot.

ALONZO W. EPRIGHT.

Copies of this patent may be obtained for five cents each, by addressing the "Commissioner of Patents. Washington, D. C."